United States Patent [19]

Pietrzak et al.

[11] Patent Number: 4,809,806
[45] Date of Patent: Mar. 7, 1989

[54] STEERING GEAR WITH HYBRID HOUSING

[75] Inventors: Gary F. Pietrzak, Saginaw; Ernest M. Plant, II, Frankenmuth, both of Mich.

[73] Assignee: General Motors Corporation, Detroit, Mich.

[21] Appl. No.: 191,084

[22] Filed: May 6, 1988

[51] Int. Cl.[4] .......................... B62D 3/12; B62D 5/22
[52] U.S. Cl. .............................. 180/148; 74/388 PS; 74/422; 74/498; 180/79
[58] Field of Search ............... 180/146, 147, 148, 149, 180/150, 132, 79.3, 79; 74/388 PS, 422, 498, 89.17

[56] References Cited

U.S. PATENT DOCUMENTS

| 3,554,048 | 1/1971 | Adams | 74/498 |
| 3,623,379 | 11/1971 | Bradshaw et al. | 74/498 |
| 3,762,240 | 10/1973 | Adams | 74/498 |
| 3,777,589 | 12/1973 | Adams | 74/498 |
| 3,844,181 | 10/1974 | Sayle | 74/498 |
| 4,593,578 | 6/1986 | Kobayashi | 180/148 |
| 4,742,883 | 5/1988 | Duffy | 74/422 |

FOREIGN PATENT DOCUMENTS 1344829  1/1974  United Kingdom ............ 74/388 PS

Primary Examiner—Charles A. Marmor
Assistant Examiner—Everett G. Diederiks, Jr.
Attorney, Agent, or Firm—Saul Schwartz

[57] ABSTRACT

A rack and pinion steering gear has a hybrid metal/plastic housing including a shell of engineering plastic for weight conservation and a metal sleeve for strength and durability. The shell has a bore therein with an internal frustoconical shoulder around one end. The sleeve is conveniently fabricated as an extrusion and has a cylindrical small end and a cylindrical big end and an external frustoconical shoulder therebetween. The steering gear pinion shaft is rotatably supported in the small end of the sleeve and the small end of the sleeve is received in the bore in the plastic shell. A lock nut threaded onto a cap on the sleeve draws the sleeve into the bore in the shell until the external shoulder seats against the internal shoulder.

4 Claims, 4 Drawing Sheets

4,809,806

STEERING GEAR WITH HYBRID HOUSING

FIELD OF THE INVENTION

This invention relates to rack and pinion steering gears for automobiles.

BACKGROUND OF THE INVENTION

Substituting engineering plastic for metal in automobile component parts is one way to achieve reduction in the total weight of the vehicle. In a rack and pinion steering gear, for example, the weight of the gear can be reduced if the housing is fabricated of engineering plastic instead of die cast aluminum or alloy. However, because the housing is a load carrying member and, if the steering gear is a power gear, because it must also be impervious to hot, high pressure hydraulic fluid and resist internal scoring by rotating valve parts, an all-plastic housing may not perform satisfactorily. A rack and pinion steering gear housing according to this invention is a hybrid metal/plastic housing which achieves weight reduction relative to conventional all-metal housings while maintaining strength and durability and which is easily adapted for different housing configurations corresponding to use in different vehicle models.

SUMMARY OF THE INVENTION

This invention is a new and improved rack and pinion steering gear housing for rack and pinion steering gears. The rack and pinion steering gear housing according to this invention includes a shell of engineering plastic adapted for attachment to the chassis of the vehicle and a metal support sleeve disposed in the shell. A pinion shaft of the steering gear is supported on the metal sleeve for rotation about a pinion axis of the steering gear housing and a steering rack of the steering gear is supported on the plastic shell for bodily movement. The metal support sleeve is conveniently fabricated as an extrusion for both manual and fluid power assisted applications. The plastic shell is conveniently molded to net shape in molds which are relatively less expensive than molds required for die casting aluminum or alloy. In a preferred embodiment of the steering gear housing according to this invention, the plastic shell has a cylindrical pinion bore therethrough with an internal frustoconical shoulder at one end, the support sleeve has a small end with a cylindrical outer wall in the pinion bore of the shell and an external frustoconical shoulder seated on the internal frustoconical shoulder of the shell, and a nut threaded on the end of the support sleeve bears against the plastic shell at the end of the pinion bore opposite the frustoconical shoulders whereby tightening of the nut seats the sleeve in the shell. In a fluid power assisted rack and pinion steering gear, the support sleeve has a big end on the opposite side of the frustoconical shoulder from the small end in which is disposed a rotary control valve of the steering gear assembly, the big end containing the hot, pressurized steering fluid and having an inner cylindrical wall defining a hard wear-resistant surface for rotating elements of the rotary control valve.

DESCRIPTION OF PREFERRED EMBODIMENTS

Figure 1:
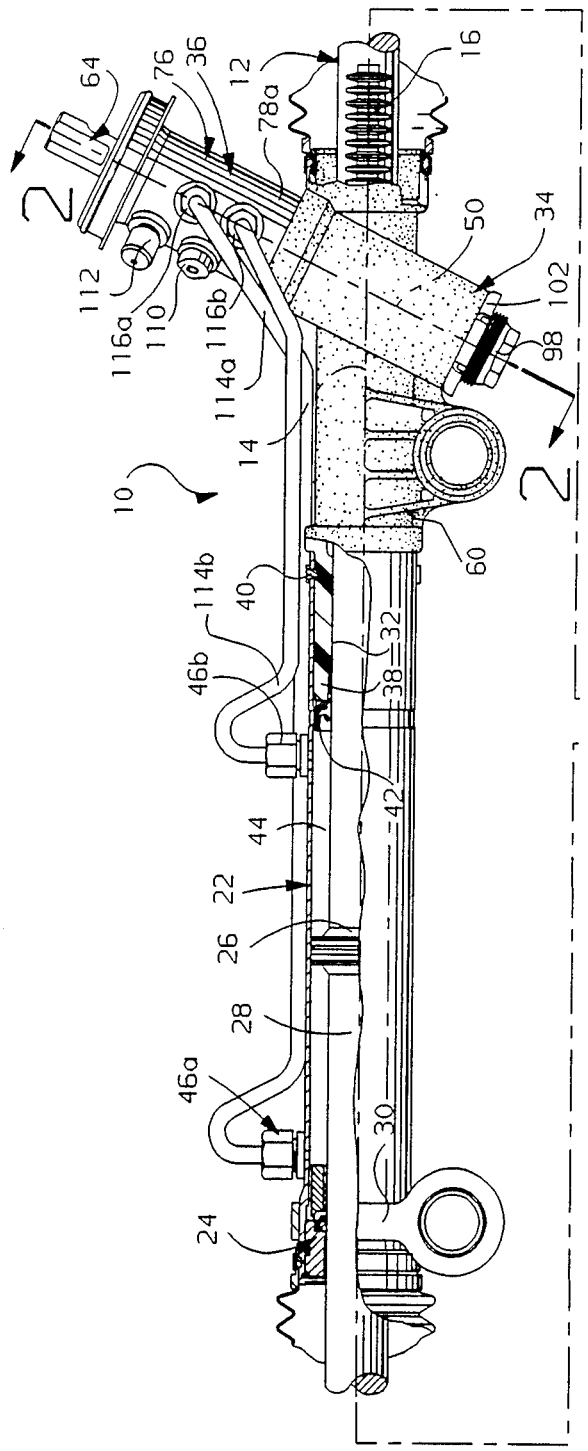
FIG. 1 is plan view of a fluid power assisted rack and pinion steering gear having a hybrid housing according to this invention.
Figure 1:
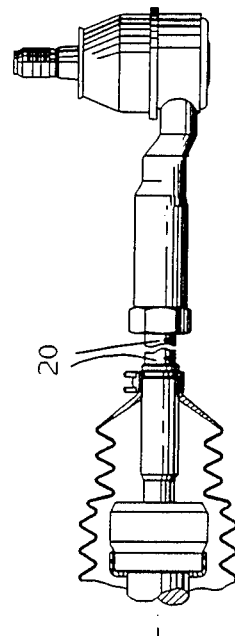
Figure 1:
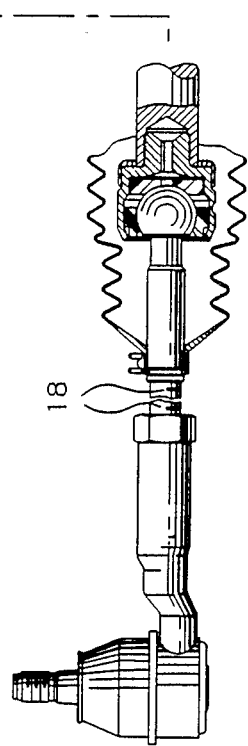
Figure 2:
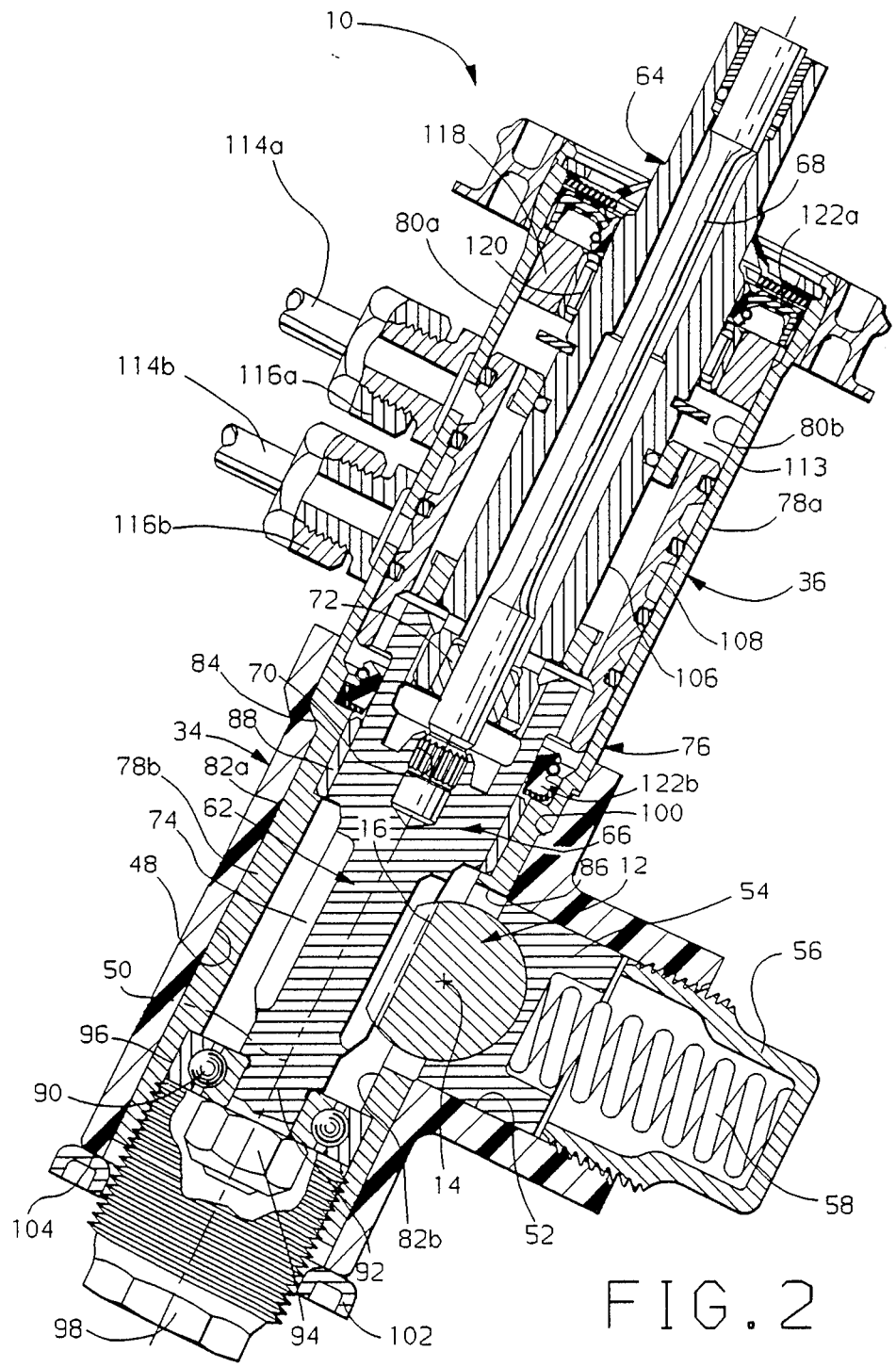
FIG. 2 is an enlarged sectional view taken generally along the plane indicated by lines 2—2 in FIG. 1.

Referring to FIGS. 1 and 2 of the drawings, a fluid power assisted rack and pinion steering gear 10 includes an elongated steering rack 12. The steering rack 12 has a longitudinal axis 14 and a plurality of rack teeth 16. The longitudinal axis 14 of the steering rack is aligned transversely of the vehicle, not shown, on which the steering gear is mounted. The left end of the steering rack 12 is connected to an adjacent steered wheel of the vehicle through a tie rod assembly 18. The right end of the steering rack 12 is connected to an adjacent steered wheel of the vehicle through a tie rod assembly 20. When the steering rack is shifted bodily in the direction of its longitudinal axis 14, the steered wheels are pivoted in unison about their respective steering axes.

A portion of the steering rack 12 is disposed within a power cylinder 22. The power cylinder has a bulkhead assembly and guide 24 at its left end slidably engaging the outside surface of the steering rack 12. To the right of the bulkhead assembly and guide 24, the steering rack carries an annular piston 26 which slidably seals against the inside wall of the power cylinder. The piston cooperates with the bulkhead assembly and guide 24 in defining a first fluid motor chamber 28. A first mounting bracket 30 is rigidly connected to the outside of the power cylinder 22 near the bulkhead assembly and guide 24 and provides an attachment point whereat the left end, FIG. 1, of the rack and pinion power steering gear 10 is rigidly attached to the chassis of the vehicle.

As seen best in FIGS. 1 and 2, a portion of the steering rack 12 to the right of the piston 26 projects through a rack bore 32 of a plastic shell 34 of a hybrid housing 36 according to this invention of the steering gear 10. A bearing sleeve 38 at the left end of the rack bore 32 slidably engages the outside diameter of the steering rack 12. The right end of the power cylinder 22 receives a corresponding outside surface of the plastic shell 34 around the left end of the rack bore. The plastic shell is connected to the power cylinder through a plurality of injection molded plastic pins 40 which fill facing circumferential grooves in the plastic shell 34 and in the power cylinder 22. A seal 42 seals between the power cylinder 22 and the steering rack 12 and cooperates with the piston 26 in defining a second fluid motor chamber 44. Alternate introduction of pressure fluid into the motor chambers 28 and 44 through respective ones of a pair of high pressure fittings 46a and 46b on the power cylinder drives the steering rack 12 in the corresponding direction along its longitudinal axis 14 thereby achieving fluid power assisted steering.

The plastic shell 34 is molded to net shape from a glass filled engineering plastic such as glass filled nylon, currently available from Hoechst Celanese under the trade name Celanese Nylon. In addition to the rack bore 32, the plastic shell 34 has a pinion bore 48 aligned on a pinion axis 50 of the shell and a bearing bore 52 intersecting the pinion bore 48, FIG. 2. A bearing block 54 is slidably disposed in the bearing bore 52 with a complementary surface slidably engaging the outside surface of the steering rack 12 on the side thereof opposite the rack teeth 16. A cap 56 is threaded into internal threads in the bearing bore 52 conveniently formed during molding of the plastic shell. A spring 58 is disposed between the cap 56 and the block 54 and biases the block against the steering rack 12. A mounting bracket 60, FIG. 1, is molded into the plastic shell and provides an attachment point whereat the right end of the steering gear 10 is rigidly connected to the chassis of the vehicle.

A shaft assembly 62 of the steering gear is situated in the pinion bore 48 of the plastic shell and includes a tubular stub shaft 64 and a pinion shaft 66. The right end of the stub shaft is adapted for driving connection to the steering wheel, not shown, of the vehicle. A torsion bar 68 within the stub shaft is pinned at its right end to the right end of the stub shaft for rotation as a unit therewith. The left end of the torsion bar is pressed into a socket 70 in the right end of the pinion shaft 66 and is rotatable as a unit with the pinion shaft. A sleeve bearing 72 is disposed between the torsion bar and the stub shaft whereby the left end of the stub shaft is rotatably supported on the torsion bar. A conventional lost motion connection, not shown, between the right end of the pinion shaft and the left end of the stub shaft allows limited rotation of the latter relative to the former before rigid stops engage to connect the two for unitary rotation. A pinion gear 74 integral with the pinion shaft 66 has a plurality of gear teeth meshing with the rack teeth 16 on the steering rack.

Figure 4A:
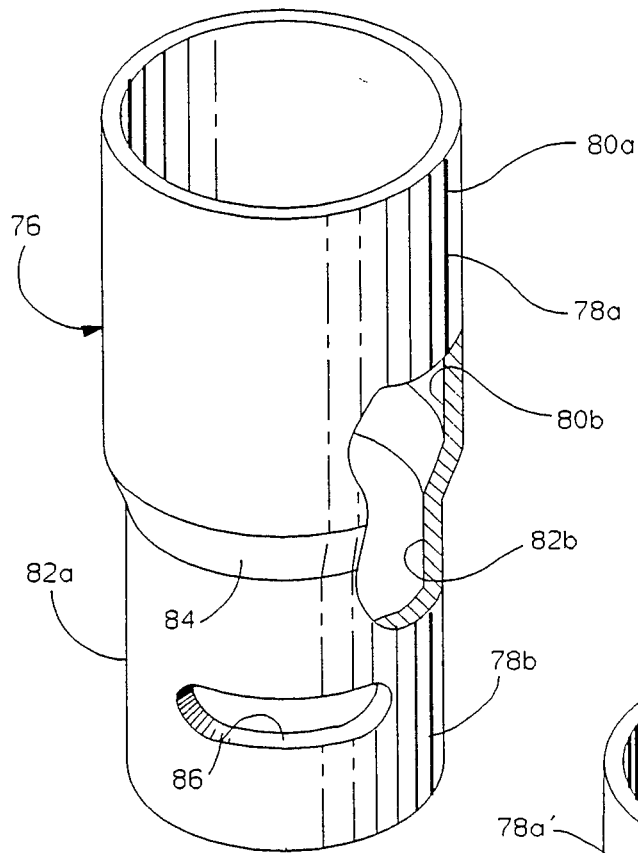
FIGS. 4a and 4b are partially broken away schematic perspective views of the metal support sleeves of the hybrid housings for the power assisted and the manual rack and pinion steering gears shown in FIGS. 2 and 3, respectively.

As seen best in FIGS. 2 and 4a, a metal support sleeve 76 is part of the hybrid housing 36 and is disposed between the plastic shell 34 and the shaft assembly 62. The support sleeve 76 is preferably fabricated as an extrusion from a solid metal slug for maximum material utilization and includes a cylindrical big end 78a and a cylindrical small end 78b. The big end 78a has an outer wall 80a and an inner wall 80b. The small end 78b has an outer wall 82a and an inner wall 82b. The outer walls 80a and 82a are connected by an external frustoconical shoulder 84. A clearance aperture 86 is formed in the small end 78b of the metal sleeve generally in alignment with the rack bore 32 in the plastic shell 34. The rack teeth 16 on the steering rack 12 protrude through the clearance aperture 86 and mesh with the teeth of the pinion gear 74.

A sleeve bearing 88 is disposed in a groove in the inner wall 82b of the small end 78b of the metal sleeve 76 and slidably engages the pinion shaft 66 near the right end of the latter. The inner race of a ball bearing 90 is received over a reduced diameter portion 92 at the left end of the pinion shaft 66 and is retained thereon by a nut 94 threaded onto the reduced diameter portion. The outer race of the bearing 90 is closely received in an unthreaded portion of a counterbore 96 at the left end of the small end 78b of the metal sleeve 76. A cup-shaped cap 98 is threaded into a threaded portion of the counterbore 96 and bears against the outer race of the bearing 90 whereby the bearing is held on the metal sleeve. The bearing 90 cooperates with the sleeve bearing 88 in supporting the pinion shaft 66 on the metal sleeve 76 for rotation about the longitudinal axis of the sleeve which axis is coincident with the longitudinal axis of the pinion shaft and with axis 50 of the plastic shell 34.

As seen best in FIG. 2, the right end of the pinion bore 48 in the plastic shell 34 is surrounded by an internal frustoconical shoulder 100. The external shoulder 84 on the metal sleeve seats against the shoulder 100 on the plastic shell 34 to establish full penetration of the sleeve into the shell. A lock nut 102 is threaded onto the outside threads of the cap 98 and bears against an end face 104 of the plastic shell around the left end of the pinion bore 48. As the lock nut is tightened against the end face, the shoulder 84 on the metal sleeve is tightly seated against the shoulder 100 on the plastic shell whereby the sleeve and the shell are rigidly united.

A conventional rotary control valve is disposed within the big end 78a of the metal sleeve 76. The control valve is like the one described in U.S. Pat. No. 3,022,772, issued Feb. 27, 1962 to Zeigler et al and assigned to the assignee of this invention, and includes a spool portion 106 integral with the stub shaft 64 and a valve sleeve 108 around the spool portion rotatable as a unit with the pinion shaft 66. The valve sleeve 108 has a plurality of outside grooves facing the inner wall 80b of the big end 78a of the sleeve. The grooves are separated by seal rings which slidingly bear against the inner wall 80b. One of the grooves communicates with a pressure fluid inlet 110. A fluid return 112, FIG. 1 communicates with a low pressure zone 113, FIG. 2, adjacent the control valve. The remaining two outside grooves in the valve sleeve communicate with respective ones of a pair of high pressure conduits 114a and 114b through a corresponding pair of high pressure fittings 116a and 116b welded to the outer wall 80a of the big end 78a of the metal sleeve 76. The conduits 114a and 114b communicate with the fluid motor chambers 28 and 44, respectively, through the high pressure fittings 46a and 46b on the power cylinder.

When the steering wheel is turned, the spool portion 106 rotates relative to the valve sleeve 108 against the simulated road feel provided by the torsion bar 68. Pressure fluid from the inlet 110 is ported to one of the fluid motor chambers 28 and 44 while the other is ported to the low pressure zone 113 and the return 112 whereby fluid power assisted steering is achieved. A ring 118 on the big end 78a of the metal sleeve supports a needle bearing 120 which controls radial run-out of the stub shaft. A pair of seals 122a and 122b on opposite sides of the rotary valve prevent loss of fluid and/or internal contamination of the steering gear.

Figure 3:
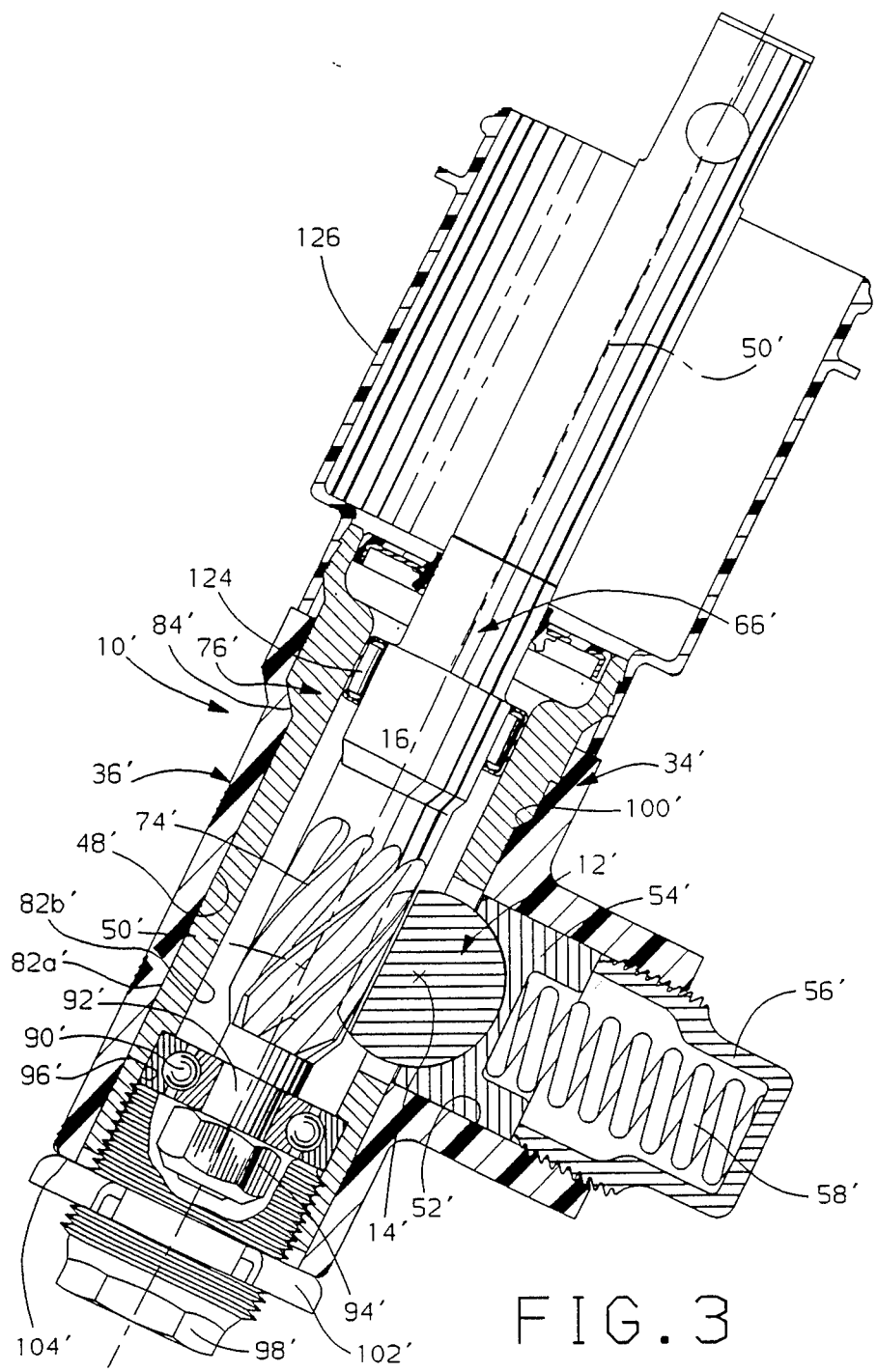
FIG. 3 is a sectional view similar to FIG. 2 but showing a manual rack and pinion steering gear having a hybrid housing according to this invention.
Figure 4B:
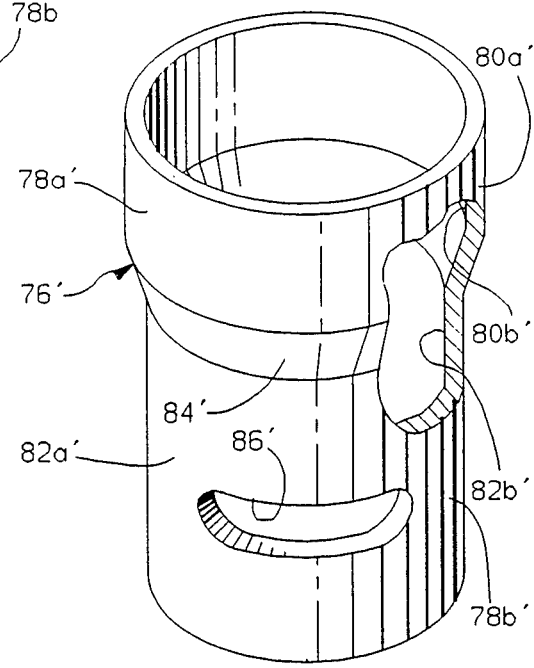

In FIGS. 3 and 4b, which illustrate relevant features of a manual rack and pinion steering gear having a hybrid housing according to this invention, primed reference characters identify elements of the manual gear corresponding to already described elements of the power gear 10. More particularly, the manual rack and pinion steering gear 10' includes a hybrid housing 36'. A plastic shell 34' of the housing 36' ha a pinion bore 48' therein surrounded by an internal frustoconical shoulder 100' at one end of the bore. A steering rack 12' of the steering gear projects through the plastic shell 34' and bears against a block 54'. The block is disposed in a bore 52' in the plastic shell and is biased against the steering rack by a spring 58' seated on a cap 56' threaded into the bore 52'. The steering rack 12' is essentially identical to steering rack 12 of the fluid power assisted steering gear 10 but does not include a piston since the steering gear 10' is not fluid power assisted.

The manual steering gear 10' further includes a pinion shaft 66' having a pinion gear 74' thereon. The right end of the pinion shaft 66' is adapted for direct driving connection to the vehicle's steering shaft. The pinion shaft 66' is disposed within a metal support sleeve 76' of the hybrid housing 36'. The sleeve 76' is preferably fabricated as an extrusion from a solid metal slug for maximum material utilization and includes a cylindrical big end 78a' and a cylindrical small end 78b'. The big end 78a' has a outer wall 80a' and an inner wall 80b'. The small end 78b' has an outer wall 82a' and an inner wall 82b'. The outer walls 80a' and 82a' are connected by an external frustoconical shoulder 84'. A clearance aperture 86' is formed in the small end 78b' of the metal sleeve generally in alignment with the rack bore 32' in the plastic shell 34'. The rack teeth on the steering rack 12' protrude through the aperture 86' and mesh with the teeth of pinion gear 74'. A needle bearing 124 is disposed between the inner wall 82b of the small end of the sleeve and the pinion shaft 66' to the right of the pinion gear 74'. The inner race of a ball bearing 90' is received over a reduced diameter portion 92' at the left end of the pinion shaft and is retained thereon by a nut 94' threaded onto the reduced diameter portion. The outer race of the bearing 90' is closely received in an unthreaded portion of a counterbore 96' at the left end of the small end 78b' of the sleeve. A cup-shaped cap 98' is threaded into a threaded portion of the counterbore 96' and seats against the outer race of the bearing 90' whereby the bearing is held on the sleeve. The bearing 90' cooperates with the needle bearing 124 in supporting the pinion shaft 66' on the metal sleeve for rotation about the longitudinal axis of the sleeve which axis is coincident with the longitudinal axis of the pinion shaft and with axis 50' of the plastic shell 34'.

As seen best in FIG. 3, the external shoulder 84' on the metal sleeve seats against the internal shoulder 100' on the plastic shell 34'. A lock nut 102' is threaded onto the outside threads of the cap 98' and bears against an end face 104' of the plastic shell around the left end of the pinion bore 48'. As the lock nut is tightened against the end face, the shoulder 84' on the metal sleeve is tightly seated against the shoulder 100' on the plastic shell whereby the sleeve and the shell are rigidly united. A cup-shaped plastic shield 126 is attached to the outside of the big end 78a' of the metal sleeve 76' to the right of the plastic shell 34'. The shield 126 surrounds the right end of the pinion shaft 66' and provides a convenient location at which to attach a flexible boot or like protective enclosure, not shown.

The metal support sleeves 76 and 76' and the plastic shells 34 and 34' are important features of this invention. As concerns manufacturing economy, the support sleeves 76 and 76' are essentially identical except in length. Accordingly, the same extrusion tooling can be used for both. Where individual applications dictate different angles between the pinion shaft axis and the steering rack axis, only the size and/or angular orientation of the clearance apertures 86 and 86' need be altered which changes require only relatively modest tooling expenditures. The big end 78a of the sleeve 76 is larger than the big end 78a' of the sleeve 76' to accommodate the rotary valve in the fluid power assisted steering gear 10.

The plastic shells 34 and 34, are fabricated in molds or dies that are less costly than metal die casting molds or dies. Therefore, where different vehicle applications dictate different locations or orientations for features such as mounting brackets 30 and 60 and the angle between the pinion axis and the steering rack axis, only relatively inexpensive tooling need be constructed.

As concerns durability, the steering gears 10 and 10' represent improvements over steering gears having all plastic housings where the pinion shafts and steering racks bear directly on the plastic. The metal support sleeves 76 and 76' provide improved rigidity and durability as compared to plastic and will, therefore, provide service life similar to all-metal housings but with less weight. In the fluid power assisted steering gear 10, moreover, the metal sleeve 76 is effective in containing hot, high pressure oil around the control valve whereas engineering plastics having the same capability are either unavailable or prohibitively expensive. Further, the inner wall 80b of the big end 78a of the metal sleeve can be hardened to resist wear due to sliding of the valve sleeve seals thereagainst.

The embodiments of the invention in which an exclusive property or privilege is claimed are defined as follows:

1. A rack and pinion steering gear comprising:
    an elongated steering rack adapted for driving connection to a pair of steerable road wheels of a vehicle and including a plurality of rack teeth thereon,
    pinion shaft means adapted for driving connection to a steering wheel of said vehicle and including a pinion gear,
    a shell fabricated of engineering plastic and defining a cylindrical pinion bore aligned on a pinion axis of said shell and a rack bore intersecting said pinion bore and a bearing bore,
    means on said plastic shell defining a bracket whereat said plastic shell is attached to said vehicle,
    a metal support sleeve including a cylindrical small end aligned on a longitudinal axis of said sleeve and a cylindrical big end aligned on said longitudinal axis and an external frustoconical shoulder between an outer wall of said small end and an outer wall of said big end,
    means on said support sleeve defining a cylindrical inner wall aligned on said longitudinal axis of said support sleeve,
    means on said support sleeve defining a clearance aperture in said support sleeve small end,
        said pinion shaft means being disposed within said metal support sleeve and aligned on said longitudinal axis of said support sleeve,
    bearing means between said support sleeve and said pinion shaft means whereby said pinion shaft means is rotatable relative to said support sleeve about said longitudinal axis,
    means on said plastic shell defining an internal frustoconical shoulder around one end of said pinion bore therein,
        said support sleeve small end being received within said plastic shell pinion bore with said external shoulder on said support sleeve engaging said internal shoulder on said plastic shell whereby penetration of said sleeve into said shell is limited,
    threaded fastener means on said support sleeve engaging said plastic shell at the end of said pinion bore opposite said internal shoulder whereby said external shoulder on said support sleeve is seated on said internal shoulder on said shell as said fastener means is tightened,
    said steering rack being disposed in said rack bore of said plastic shell with said rack teeth thereon meshing with said pinion gear through said clearance aperture in said support sleeve, a bearing block slidably disposed in said bearing bore and engaging said steering rack on the side thereof opposite said rack teeth, and spring means in said bearing bore between said bearing block and said plastic shell biasing said bearing block against said steering rack and said steering rack against said pinion gear.

2. A rack and pinion steering gear comprising:

an elongated steering rack adapted for driving connection to a pair of steerable road wheels of a vehicle and including a plurality of rack teeth thereon, a shell fabricated of engineering plastic and defining a cylindrical pinion bore aligned on a pinion axis of said shell and a rack bore and a bearing bore, means on said plastic shell defining a bracket whereat said plastic shell is attached to said vehicle, a metal support sleeve including a cylindrical small end aligned on a longitudinal axis of said sleeve and a cylindrical big end aligned on said longitudinal axis and an external frustoconical shoulder between an outer wall of said big end and an outer wall of said small end, means on said support sleeve defining a cylindrical inner wall aligned on said longitudinal axis of said support sleeve and a counterbore at one end of said cylindrical inner wall, means on said support sleeve defining a clearance aperture in said support sleeve small end, a pinion shaft disposed in said support sleeve and including a pinion gear registering with said clearance aperture and a reduced diameter portion at one end, a first bearing between said pinion shaft and said support sleeve, a second bearing between said pinion shaft and said support sleeve including an inner race rigidly attached to said reduced diameter portion of said pinion shaft and outer race seated in said counterbore in said support sleeve, a cap threaded into said counterbore longitudinally outboard of said bearing outer race whereby said bearing outer race is captured on said support sleeve, said first and said second bearings cooperating in supporting said pinion shaft on said support sleeve for rotation about said support sleeve longitudinal axis, means on said plastic shell defining an internal frustoconical shoulder around one end of said pinion bore therein, said support sleeve small end being received within said plastic shell pinion bore with said external shoulder on said support sleeve engaging said internal shoulder on said plastic shell whereby penetration of said sleeve into said shell is limited, a lock nut threaded onto said cap and engaging said plastic shell at the end of said pinion bore opposite said internal shoulder whereby said external shoulder on said support sleeve is seated on said internal shoulder on said shell as said lock nut is tightened, said steering rack being disposed in said rack bore of said plastic shell with said rack teeth thereon meshing with said pinion gear through said clearance aperture in said support sleeve, means operative to drivingly connect said pinion shaft to a steering wheel of said vehicle, a bearing block slidably disposed in said bearing bore and engaging said steering rack on the side thereof opposite said rack teeth, and spring means in said bearing bore between said bearing block and said plastic shell biasing said bearing block against said steering rack and said steering rack against said pinion gear.

3. The steering gear recited in claim 2 wherein said means operative to drivingly connect said pinion shaft to a steering wheel of said vehicle includes a tubular stub shaft disposed on said support sleeve for rotation about said longitudinal axis thereof having one end adapted for connection to said steering wheel and the other end rotatable relative to said pinion shaft, and a torsion bar disposed in said tubular stub shaft having one end rigidly connected to said stub shaft at said one end of said stub shaft and the other end rigidly connected to said pinion shaft.

4. The steering gear recited in claim 3 and further including a rotary control valve disposed on said stub shaft within said support sleeve big end and including a valve spool rotatable as a unit with said stub shaft and a valve sleeve around said valve spool rotatable as a unit with said pinion shaft.

* * * * *